(12) United States Patent
Vitkala et al.

(10) Patent No.: US 7,127,918 B2
(45) Date of Patent: *Oct. 31, 2006

(54) METHOD AND APPARATUS FOR HEATING GLASS SHEETS IN PREPARATION OF TEMPERING

(75) Inventors: Jorma Vitkala, Tampere (FI); Mauri Leponen, Tampere (FI); Tarmo Pesonen, Moiaio (FI); Pauli Reunamäki, Tampere (FI)

(73) Assignee: Tamglass Ltd. Oy, Tampere (FI)

( * ) Notice: Subject to any disclaimer, the term of this patent is extended or adjusted under 35 U.S.C. 154(b) by 597 days.

This patent is subject to a terminal disclaimer.

(21) Appl. No.: 10/259,862

(22) Filed: Sep. 30, 2002

(65) Prior Publication Data
US 2003/0061834 A1 Apr. 3, 2003

(30) Foreign Application Priority Data
Oct. 1, 2001 (FI) .................................. 20011923

(51) Int. Cl.
*C03B 27/044* (2006.01)
(52) U.S. Cl. .............................. 65/115; 65/119; 65/349
(58) Field of Classification Search ............... 65/29.15, 65/29.19, 115, 119, 134.6, 161, 162, 349
See application file for complete search history.

(56) References Cited

U.S. PATENT DOCUMENTS

| | | | | |
|---|---|---|---|---|
| 4,390,359 A | * | 6/1983 | Reunamaki | 65/114 |
| 5,057,138 A | | 10/1991 | Vehmas et al. | |
| 5,938,810 A | * | 8/1999 | De Vries et al. | 65/268 |
| 5,951,734 A | | 9/1999 | Friedel et al. | |
| 6,845,633 B1 | * | 1/2005 | Vitkala | 65/29.19 |
| 6,901,773 B1 | * | 6/2005 | Thomas et al. | 65/118 |
| 2002/0134109 A1 | * | 9/2002 | Vitkala | 65/29.15 |

FOREIGN PATENT DOCUMENTS

| | | |
|---|---|---|
| FI | 83072 F1 | 2/1991 |
| WO | 98/01398 A1 | 1/1998 |

* cited by examiner

*Primary Examiner*—Sean Vincent
(74) *Attorney, Agent, or Firm*—Buchanan Ingersoll & Rooney PC

(57) ABSTRACT

A method and apparatus for heating glass sheets in preparation of tempering. A furnace (1) is provided with upper and lower convection blasting conduits (11, 14) extending lengthwise of the furnace. The furnace is also provided with upper and lower radiation heating elements (12, 16). The convection heating air is pressurized with a compressor (3), cleaned with a filter (4). The upper convection heating air is heated with air discharged from the furnace in a plurality of separate heat exchangers (7), through which the convection heating air is passed into the upper convection blasting conduits (11). The amount of air discharged from the furnace (1) through the heat exchangers (7) is substantially equal to that blasted into the furnace for convection heating.

18 Claims, 2 Drawing Sheets

METHOD AND APPARATUS FOR HEATING GLASS SHEETS IN PREPARATION OF TEMPERING

The invention relates to a method for heating glass sheets in preparation of tempering, said method comprising heating horizontal glass sheets with upper and lower convection blasting and upper and lower radiation heating, pressurizing convection heating air with a compressor and cleaning with a filter and adjusting the widthwise profile of upper convection heating by controlling the amount of convection air to be separately blasted to a plurality of widthwise parallel heating zones.

The invention relates also to an apparatus for heating glass sheets in preparation of tempering, said apparatus comprising horizontal conveyor rolls and upper and lower convection heating elements, upper and lower radiation heating elements, a compressor for producing pressurized convection heating air for the convection heating elements, and an oil and/or particle filter, through which the convection heating air is passed.

It is prior known to circulate heated air in the furnace of a tempering facility for convection blasting. This provides effective convection blasting without heat losses caused by discharge air. However, the circulated air becomes gradually contaminated, causes optical degradation of the glass surface or even obstructions of the nozzles. Another problem with prior known furnaces has been control of the widthwise profile of convection heating or a total absence of capability of providing a widthwise intensity profile for convection heating.

U.S. Pat. No. 5,951,734 discloses a method and apparatus of the above type, which can be used for adjusting the widthwise profile of upper convection heating. The convection air is cleaned with a filter. Lower convection has not been described, nor are any means for avoiding heat loss.

It is an object of the invention to develop further this prior known method and apparatus in such a way that the furnace can be continuously supplied with fresh clean air for both upper and lower convection without substantial heat loss, while enabling effective control over the widthwise profiling of upper and lower convection heating.

This object is accomplished by a method as disclosed in the appended claim 1 and by an apparatus as disclosed in claim 4. The non-independent claims disclose preferred embodiments of the invention.

Figure 1:
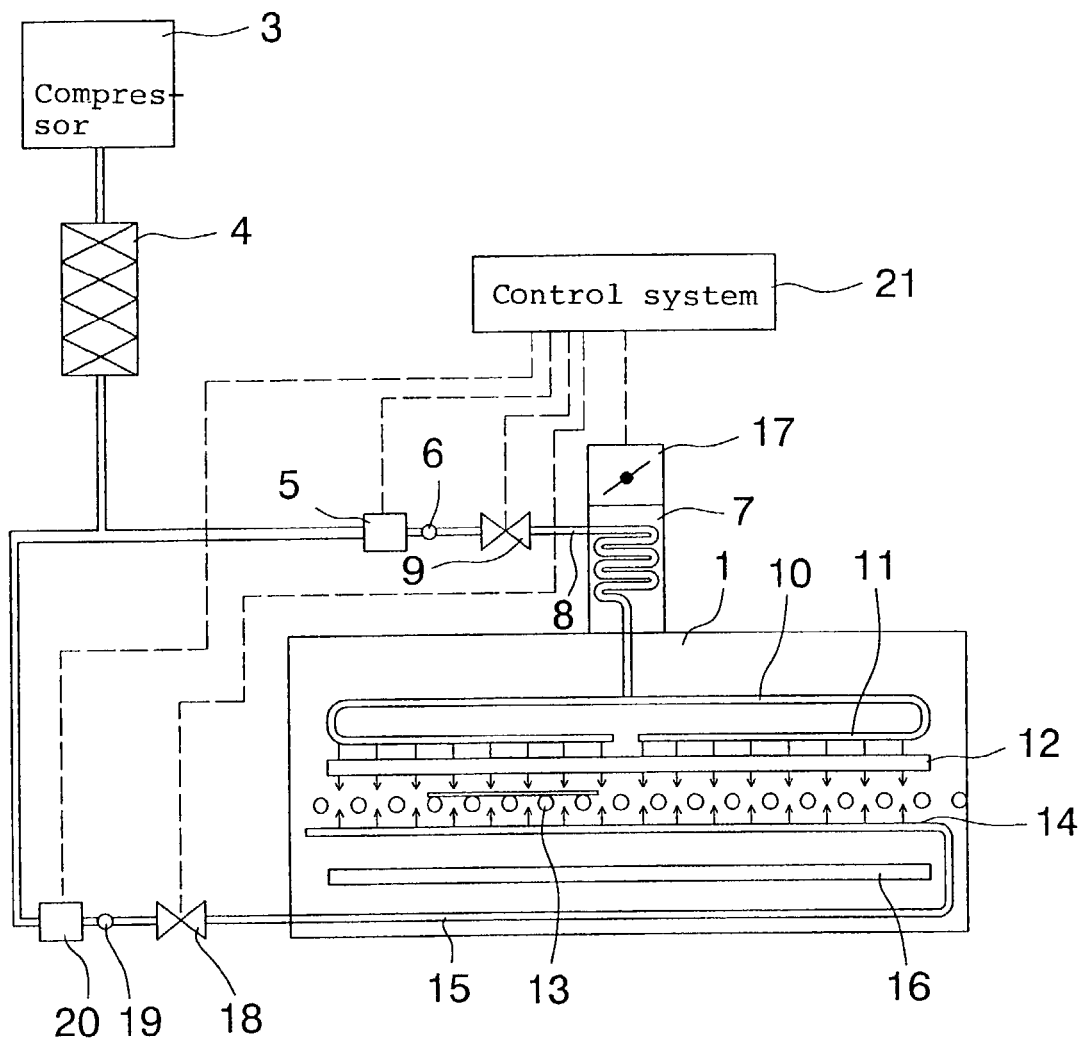
Figure 2:
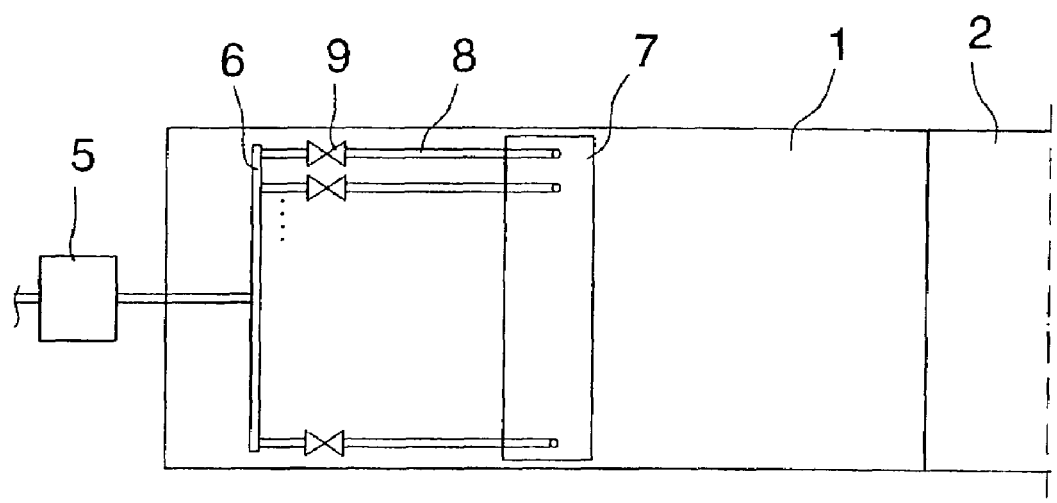

One exemplary embodiment of the invention will now be described in more detail with reference to the accompanying drawing, in which FIG. 1 shows schematically an apparatus of the invention, with the furnace depicted in a longitudinal elevation; and FIG. 2 shows the same furnace assembly schematically in a plan view.

Glass sheets are conveyed on rolls 13 in a furnace 1 typically in an oscillating manner back and forth, prior to passing the glass sheets heated to a tempering temperature into a tempering station 2, wherein both surfaces of the glass sheet are subjected in a prior known fashion to effective chill tempering.

The furnace 1 is provided with upper convection heating elements 11, comprising conduits lengthwise of the furnace, a plurality of which are side by side and which have orifices for discharging convection heating air down or diagonally downward through gaps between upper heating resistances 12. In order to preheat upper convection heating air, the air is circulated within the furnace in conduits 10 a distance equaling substantially half of the furnace length before the air reaches the convection heating conduit 11 provided with orifices.

Respectively, lower convection heating elements 14 comprise conduits lengthwise of the furnace, a plurality of which are side by side and which are also provided with orifices for discharging jets of convection air into gaps between the rolls 13 (and possibly also towards the rolls 13). In the illustrated case, lower radiation heating resistances 16 are located below the convection blast conduits 14, but can be located also between the same or can be structurally integrated with each other. The conduits 14 can also be positioned below the resistances 16, in which case the discharge would occur through gaps between the resistances 16. In order to preheat lower convection heating air, the air is circulated within the furnace in conduits 15 a distance equaling substantially the furnace length before the air reaches the convection heating conduit 14 provided with orifices.

There are a number of the upper convection heating conduits 11 side by side widthwise of the furnace, resulting in a plurality of widthwise parallel heating zones. The convection heating air to be delivered into the conduits 11 is first pressurized with a compressor 3 and cleaned of oil and other particles with a filter 4. A stepless flow regulator 5 can be used for controlling the total amount of air in upper convection blast or discharge. Of course, flow regulators can also be provided for branch pipes 8 downstream of a manifold 6, by way of which the flows are delivered into the upper convection discharge conduits 11. In this case, the flow regulator 5 is not needed. In the present case, the branch pipes 8 are provided with valves 9 (ON/OFF or control valves), which can be controlled for varying amounts of convection air to be discharged and/or discharge times and, thus, for adjusting the widthwise profile of upper convection heating.

The branch pipes 8 are passed either through a common heat exchanger 7 or each branch pipe 8 is provided with its own heat exchanger 7 which obtains its heating energy by cooling the air discharged from the furnace. The heat exchanger or heat exchangers 7 may operate on a counter-flow principle. The air is discharged from the furnace in a space of the heat exchanger 7 surrounding the heat exchanging surfaces of the branch pipes 8. Capacity of the heat exchanger 7 is adjusted by having a flow regulator 17 control the amount of discharge air traveling through the heat exchanger 7. Widthwise profiling can be adjusted by means of the valves 9 or flow regulators fitted in the branch pipes 8 upstream of the heat exchangers 7.

The widthwise profile of lower convection heating is adjusted in the present case by regulating the amounts of air to be blasted into the parallel conduits 14 by means of valves 18 or flow regulators, the number of which is one for each conduit 14. The lower convection air has been delivered by the compressor 3 through the filter 4 and a flow regulator 20 into a manifold 19, from which the air flow is distributed through the valves or regulators 18 and preheating conduits 15 to the convection conduits 14. The conduits 14 and 15 may constitute a single long U-form tube lengthwise of the furnace, a plurality of said U-form tubes being side by side widthwise of the furnace.

The amount of air discharged from the furnace 1 through the heat exchangers 7 is substantially equal to the amount blasted into the furnace for upper and lower convection heating. Thus, the furnace can be continuously supplied with clean air. By virtue of the heat exchanger 7, there will be no significant heat loss.

The flow regulators 5 and 20, the valves 9 and 18 and the discharging flow regulator 17 are controlled by a control device 21 in such a way that, on the one hand, the upper and lower widthwise profile forms of convection heating are substantially consistent with each other, and that the total of flow rates passing through the regulators 5 and 20 is substantially equal to the total of flow rates discharging through the regulator or regulators 17. Thus, the furnace shall not develop excessive overpressure. The control system 21 may have its memory previously stored with convection control parameters consistent with various glass thicknesses and with ratings for the regulators and valves.

What is claimed is:

1. A method for heating glass sheets in preparation of tempering, said method comprising heating horizontal glass sheets with upper and lower convection blasting and upper and lower radiation heating, pressurizing convection heating air with a compressor and cleaning with a filter and adjusting the widthwise profile of upper convection heating by controlling the amount of convection air to be separately blasted to a plurality of widthwise parallel heating zones, wherein upper convection heating air is heated with air discharged from a furnace in a heat exchanger, through which the convection heating air is delivered into a furnace, the amount of air discharged from the furnace through the heat exchangers is substantially equal to the amount of air blasted into the furnace for convection heating, the widthwise profile of lower convection heating is adjusted by controlling the amount of convection air to be separately blasted to a plurality of widthwise parallel heating zones, and wherein the widthwise profiles of upper and lower convection heating are adjusted with profiling consistently with each other.

2. A method as set forth in claim 1, wherein the capacity of the heat exchanger is adjusted by controlling the amount of discharge air traveling through the same.

3. A method as set forth in claim 1, wherein the upper and lower convection heating air is preheated by circulating air in a conduit extending within the furnace through at least about a half of the furnace length before the air reaches a convection discharge conduit provided with orifices.

4. An apparatus for heating glass sheets in preparation of tempering, said apparatus comprising:

horizontal conveyor rolls, upper and lower convection heating elements, upper and lower radiation heating elements, a compressor for producing pressurized convection heating air for the convection heating elements, and a filter, through which the convection heating air is passed, and elements for adjusting the widthwise profile of upper and lower convection heating in such a way that the widthwise profiles of upper and lower convection heatings comply substantially with each other, wherein the upper convection heating air is passed through one or more heat exchangers to a plurality of convection heating zones which extend lengthwise of the furnace and are located side by side widthwise of the furnace, the heat exchangers receive their heating energy by cooling the air discharged from a furnace, the amount of air to be discharged from the furnace through the heat exchangers is substantially equal to the amount of air to be blasted into the furnace for convection heating, the lower convection heating air is passed to a plurality of convection heating zones which extend lengthwise of the furnace and are located side by side widthwise of the furnace.

5. An apparatus as set forth in claim 4, wherein the upper and lower convection heating elements comprise conduits lengthwise of the furnace, which are provided with orifices and which have their supply air pipes provided with at least one of valves and flow rate regulators present outside the furnace.

6. An apparatus as set forth in claim 4, wherein the heat exchanger is provided with a regulator for the discharging flow.

7. An apparatus as set forth in claim 4, wherein the widthwise profiles of upper and lower convection heatings are adjustable by controlling at least one of the amounts and blasting times of convection air to be blasted through the convection heating elements parallel to each other and side by side in a widthwise direction of the furnace.

8. An apparatus as set forth in claim 4, wherein the filter comprises an oil filter.

9. An apparatus as set forth in claim 4, wherein the filter comprises a particle filter.

10. A method for heating glass sheets in preparation of tempering, said method comprising heating horizontal glass sheets in a furnace with upper and lower convection blasting and upper and lower radiation heating, pressurizing convection heating air with a compressor and cleaning with a filter and adjusting the widthwise profile of upper convection heating by controlling the amount of convection air to be separately blasted to a plurality of widthwise parallel heating zones, wherein upper convection heating air is heated with air discharged from the furnace in a heat exchanger, through which the upper convection heating air is delivered into a furnace, the lower convention heating air being not passed through the heat exchanger, the amount of air discharged from the furnace through the heat exchanger is substantially equal to the amount of air blasted into the furnace for upper and lower convection heating, and the widthwise profile of lower convection heating is adjusted by controlling the amount of convection air to be separately blasted to a plurality of widthwise parallel heating zones.

11. A method as set forth in claim 10, wherein the widthwise profiles of upper and lower convection heating are adjusted with profiling consistently with each other.

12. A method as set forth in claim 10, wherein the upper and lower convection heating air is preheated by circulating air in a conduit extending within the furnace through at least about a half of the furnace length before the air reaches a convection discharge conduit provided with orifices.

13. An apparatus for heating glass sheets in preparation of tempering, said apparatus comprising:

a furnace, horizontal conveyor rolls, upper and lower convection heating elements, upper and lower radiation heating elements, a compressor for producing pressurized convection heating air for the convection heating elements, a filter, through which the convection heating air is passed, and elements for adjusting the widthwise profile of upper and lower convection heating in such a way that the widthwise profiles of upper and lower convection heatings comply substantially with each other, wherein the upper convection heating air is passed through one or more heat exchangers to a plurality of convection heating zones which extend lengthwise of the furnace and are located side by side widthwise of the furnace, wherein the heat exchangers receive their heating energy by cooling the air discharged from a furnace, wherein the amount of air to be discharged from the furnace through the heat exchangers is substantially equal to the amount of air to be blasted into the furnace for upper and lower convection heating, wherein the lower convection heating air which is not passed through the heat exchanger is passed to a plurality of convection heating zones which extend lengthwise of the furnace and are located side by side widthwise of the furnace.

14. An apparatus as set forth in claim 13, wherein the upper and lower convection heating elements comprise conduits lengthwise of the furnace, which are provided with orifices and which have their supply air pipes provided with at least one of valves and flow rate regulators present outside the furnace.

15. An apparatus as set forth in claim 13, wherein the heat exchanger is provided with a regulator for the discharging flow.

16. An apparatus as set forth in claim 13, wherein the widthwise profiles of upper and lower convection heatings are adjustable by controlling at least one of the amounts and blasting times of convection air to be blasted through the convection heating elements parallel to each other and side by side in a widthwise direction of the furnace.

17. An apparatus as set forth in claim 13, wherein the filter comprises an oil filter.

18. An apparatus as set forth in claim 13, wherein the filter comprises a particle filter.

* * * * *